United States Patent Office 3,763,189
Patented Oct. 2, 1973

3,763,189
2,2-BIS(CARBOXYMETHYL)-3-OXA-4-CARBOXY-
4-HYDROXY-BUTANOIC ACID LACTONE
Russel D. Harken, Maryland Heights, Mo., assignor to
Monsanto Company, St. Louis, Mo.
No Drawing. Filed Mar. 29, 1972, Ser. No. 239,353
Int. Cl. C07d 13/04
U.S. Cl. 260—340.2          2 Claims

ABSTRACT OF THE DISCLOSURE

Salts of 2,2-bis(carboxymethyl)-3-oxa-4-carboxy-4-hydroxy-butanoic acid lactone represented by the formula

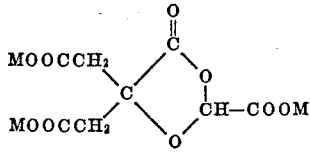

wherein M is an alkali metal or ammonium, are useful sequestrants and detergency builders. The acid form of such compounds is a useful intermediate for their preparation.

BACKGROUND OF THE INVENTION

This invention relates to novel compounds and precursors thereof useful as sequestrants and detergency builders and to methods of preparing such compounds and precursors. Numerous materials are known which, by virtue of sequestering characteristics and/or capability to enhance the cleansing ability of detergent formulations in combination with various surfactants are useful in water treating applications, or as adjuvants, reenforcers, supplements, augmentors, potentiators and/or benefactors in detergent formulations wherein such materials are usually referred to as detergency builders. It is noted that although many detergency builders are also sequestrants, the determination of materials which are effective detergency builders is a complex matter, empirical in nature and not accurately predictable from known characteristics of the materials.

Many materials of the foregoing type are characterized by high phosphorous content such as the alkali metal tripolyphosphates widely employed as detergency builders. It has recently been suggested by some researchers that such compounds may contribute to the acceleration of eutrophication processes. Accordingly, particularly in the detergent builder field, extensive efforts have been exerted to provide alternate functional compounds free of phosphorus.

SUMMARY OF THE INVENTION

It is an object of this invention to provide novel compounds and intermediates useful for the production of such compounds which are useful as sequestrants and as detergency builders. A further object of the invention is to provide methods for preparing such compounds.

The novel compounds of this invention and their manufacture and utility will be understood from the following description of the preferred embodiments.

DESCRIPTION OF THE PREFERRED EMBODIMENTS

The novel compounds of this invention are represented by the formula

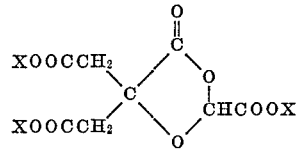

wherein X is hydrogen, alkali metal or ammonium. The acid form of such compounds is designated 2,2-bis(carboxymethyl)-3-oxa-4-hydroxy-butanoic acid lactone.

The acid form of the compounds of this invention is prepared by condensation of citric acid and oxoethanoic acid in the presence of an acid catalyst such as p-toluenesulfonic acid, benzenesulfonic acid, ethanesulfonic acid, hydrochloric acid (hydrogen chloride), sulfuric acid, oxalic acid, dichloroacetic acid, trichloroacetic acid, trifluoroacetic acid, or the like.

The reaction will be conducted in a solvent capable of dissolving at least a portion of the citric acid, for example, dioxane or 1,2-dimethoxyethane. During the reaction, water formed is removed, for example, by use of desiccants or azeotropic distillation. Use of mixed solvent/azeotroping agent systems, e.g. benzene/dioxane; benzene/1,2-dimethoxyethane, toluene/dioxane or 1,2-dimethoxyethane, etc. facilitates conducting the reaction with simultaneous azeotropic removal of water.

The reaction is preferably conducted at temperatures of from 80° C.–150° C., most preferably 90° C–120° C. Atmospheric pressure is preferred although higher or lower pressure can be utilized.

Solid product is physically separated, for example, by filtration, decantation, etc. and, if desired, can be purified by recrystallization from water. The acid is readily converted to the salt forms by conventional neutralization procedures. Salt forms obtained in an aqueous medium can be conveniently precipitated by addition of acetone.

The salt forms of the compounds of this invention are preferred as metal ion sequestrants and as detergency builders.

Detergent formulations utilizing the compounds of this invention as builders will contain from 1 to 75% by weight, preferably from 5 to 50% by weight of the salt, preferably sodium salt forms of the compounds of this invention. Such compounds can be utilized as the sole detergency builder in the compositions or in combination with other known detergency builders such as water soluble inorganic builder salts, for example, alkali metal carbonates, borates, phosphates, polyphosphates, bicarbonates and silicates or organic builders such as salts of phytic acid, sodium citrate, water soluble polymeric polycarboxylates as described in U.S. Pat. 3,308,067 and the like.

The detergent formulations will additionally contain at least 8% by weight of a surfactant. Any of the numerous well-known anionic, nonionic, zwitterionic or ampholytic surfactants can be employed.

Examples of suitable anionic surfactants include alkyl ethyl sulfonates, alkyl sulfates, acyl sarcosinates; acyl esters of isocyanates, acyl N-methyl taurides, and alkyl aryl sulfonates. The foregoing materials are used in the form of their water-soluble sodium, potassium, ammonium and alkyl ammonium salts. Specific examples include sodium laryl sulfate; sodium dodecyl benzene sulfonate; and triethanolamine undecanol benzene sulfonate.

Examples of suitable nonionic detergents include alkyl phenol and alcohol alkoxylates including condensates of 1-decanol or 1-undecanol with from 3 to 5 molecular proportions of ethylene oxide; condensates of monohydroxy or polyhydroxy alcohols such as oleyl alcohol or 1-tridecanol with from 9 to 15 molecular proportions of ethylene oxide; alkyl internal vicinal dialkoxy or hydroxy alkoxy compounds; and condensates of alkylene oxides with organo amines, for example, ethylene diamine and amides such as N-octadecyl diethanol amide.

Examples of cationic surfactants include octadecyl ammonium chloride; straight chain fatty amines having 8 to 18 carbon atoms; and quaternary ammonium compounds such as octadecyl trimethyl ammonium chloride.

Suitable ampholitic surfactants include the amido alkene sulfonates such as sodium C-pentadecyl, N-methyl amido ethyl sulfonate potassium, C-octyl N-naphthalene amido propyl sulfonate; ammonium C-decyl, N-cyclo propyl amido butyl sulfonate, and aliphatic amine derivatives in which the aliphatic substituent contains an anionic water-solubilizing substituent such as a carboxy, sulfo, phosphato, or phosphino group, for example, sodium-3-dodecyl amino propionate and sodium-3-dodecyl amino propane sulfonate.

Examples of zwitterionic surfactants include derivatives of quaternary ammonium phosphonium and sulfonium compounds such as 3-(N,N-dimethyl-N-hexadecyl ammonio) propane-1-sulfonate and 3-(N,N-dimethyl-N-haxadecyl ammonio-2-hydroxy propane-1-sulfonate).

It will be understood that the above examples of supplementary surfactants are by no means comprehensive. Numerous other surfactants are known to those skilled in the art and are set forth in such familiar references as Surface Active Agents by A.M. Schwarz and James W. Perry. It will be further understood that the use of such surfactants will be in accordance with conventional, well-understood practices of detergent formulation. For example, cationic and anionic detergents will not normally be employed in combination due to recognized problems of precipitation of insoluble products.

In accordance with general practice, the ratio of the detergency building components to the surfactant components will be in the range of from 1:2 to about 12:1 by weight.

In addition to surfactant and builder components, the detergent formulations may contain fillers such as sodium sulfate and minor amounts of bleaches, dyes, optical brightners, soil anti-redeposition agents, perfumes and similar conventional detergent formulation additives.

The invention is further illustrated by the following examples wherein all parts and percentages are by weight unless otherwise indicated.

Example I

Anhydrous citric acid (96 parts), oxoethanoic acid (37 parts) are mixed with 200 parts benzene, 100 parts dioxane and 0.5 parts p-toluenesulfonic acid. The mixture is refluxed for about 15 hours with continuous water separation. Solid product is separated, dried and identified as 2,2-bis(carboxymethyl)-2-oxa-4-carboxy-4-hydroxybutanoic acid lactone. The product is neutralized in water with sodium carbonate to yield the trisodium salt which is precipitated by addition of acetone.

Example II

The salt produced according to Example I is tested for sequestration characteristics and found to effectively sequester $Ca^{++}$ ions.

Example III

Detergent formulations containing 12% linear alkylbenzene sulfonate having an average alkyl chain length of about 12 carbon atoms from 5 to 75% of the salt produced in accordance with Example I; 12% sodium silicate having an $SiO_2$ to $Na_2O$ ratio of about 2.4; and a quantity of sodium sulfate sufficient to equal 100% are found, in conventional laundry operations, to clean soiled samples of cotton and polyester cotton broadcloth substantially better than otherwise identical formulations containing no builder salt. These tests demonstrate that this material is an effective detergency builder.

Example IV

The tests of Example III above are repeated using a detergent formulation in which Neodole 45-11 (a nonionic surfactant) which is an adduct of a modified oxo type $C_{14}$–$C_{15}$ alcohol with an average of 11 moles of ethylene oxide is substituted for the alkylbenzene sulfonate. Comparable results are obtained.

Example V

The tests of Example III are repeated with a detergent formulation wherein sodium hydroxyalkyl ($C_{14}$–$C_{16}$ alkyl chain length) N-methyl taurate, and ampholytic surfactant, is substituted for the alkylbenzene sulfonate. Comparable results are obtained.

Example VI

The tests of Example III are repeated with a detergent formulation wherein cocodimethylsulfopropylbetaine, a zwitterionic surfactant is substituted for the alkylbenzene sulfonate. Comparable results are obtained.

What is claimed is:

1. Compounds represented by the formula

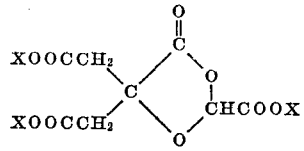

wherein X is selected from the group consisting of hydrogen, alkali metal and ammonium.

2. A compound according to claim 1 wherein X is sodium.

References Cited

UNITED STATES PATENTS

| | | | |
|---|---|---|---|
| 699,422 | 5/1902 | Sternberg | 260—340.2 |
| 3,173,925 | 3/1965 | Seeliger | 260—340.2 |

OTHER REFERENCES

Berichte der Deut. Chem. Ges., vol. 72 (1939), pp. 798–803.

NORMA S. MILESTONE, Primary Examiner

U.S. Cl. X.R.

252—558